TAPE CUSHIONING APPARATUS FOR TAPE TRANSPORTS

Filed July 1, 1966 3 Sheets-Sheet 1

INVENTORS
RALPH HERMAN &
RAYMOND W. RAYNOR
Edward J. Norton
Attorney

TAPE CUSHIONING APPARATUS FOR TAPE TRANSPORTS

INVENTORS
RALPH HERMAN &
BY RAYMOND W. RAYNOR
Edward J. Norton
Attorney

Aug. 27, 1968 R. HERMAN ET AL 3,398,910

TAPE CUSHIONING APPARATUS FOR TAPE TRANSPORTS

Filed July 1, 1966 3 Sheets-Sheet 3

INVENTORS
Ralph Herman &
Raymond W. Raynor
BY Edward J. Norton
ATTORNEY

United States Patent Office 3,398,910

Patented Aug. 27, 1968

3,398,910
TAPE CUSHIONING APPARATUS FOR TAPE TRANSPORTS

Ralph Herman, Cherry Hill, and Raymond W. Raynor, Robbinsville, N.J., assignors to Radio Corporation of America, a corporation of Delaware Filed July 1, 1966, Ser. No. 562,398
8 Claims. (Cl. 242—55.12)

ABSTRACT OF THE DISCLOSURE

There is disclosed an end of tape travel cushioning apparatus. A flexible member is adapted at one end for mounting to a tape reel, the other end having first and second hook-like projections. The first projection is shaped so that it deflects the tape when the transport is running. If the tape runs past a normal stop position the tape exerts a force on the first projection which in turn exerts a force on the second projection, which in turn exerts a torque on the tape reel, counter to the direction of reel motion.

The present invention relates to tape transport apparatus and more particularly to an end of tape travel cushioning apparatus.

In many tape transport systems the ends of the tape are secured to the takeup and supply reels by means of screw clamps or other suitable devices. This is necessary to avoid causing the tape to run off a reel and hence to avoid rethreading. This feature is particularly important in tape transports used in environments that cannot be conveniently attended by man; such as tape recorders used in satellites, units under the ocean or deep in the ground, and so on. In such machines the prior art uses sensitive relays, photocells, perforated tape as well as various other means to give a normal end of tape signal, to indicate that this condition has been achieved and motion should be stopped or reversed. However, such devices can fail. The tape will run through the normal end of tape indication without stopping, and motion will continue in the same direction until the clamped end of the tape is reached. At this point due to the inertia of the rotating parts and due to the elasticity of the tape, such as Mylar, the transport will oscillate in decreasing periods before finally coming to a stop. In addition to this oscillating motion which subjects the rotating parts to extreme forces, there is a stretching and eventual tearing of the tape. In any case for applications as in satellite tape recorders the above described oscillation will subject the satellite to disruptive motions, as the transport is mounted therein, and such motions may be so violent as to cause disrupt nutation of the satellite or to the satellite motion to such an extent that it is beyond the satellite's attitude control system to restore normal operation.

It is therefore an object of the present invention to provide an improved apparatus for effectively reducing disruptive oscillations occurring upon an end-of-tape condition in a tape transport.

Another object is to provide an economical and efficient tape transport cushioning apparatus.

It is a further object to provide an improved apparatus used in conjunction with a tape transport to reduce the stretching of the tape.

These and further objects of the present invention are achieved in one embodiment by mounting a flexible member on either both or one of the takeup and supply reels in a tape transport. The member has provisions at one end for mounting to a reel and the other end is fabricated to have first and second projections. The first projection is shaped so that it deflects the tape while the transport is running. If the tape runs beyond the normal end of tape signal, it will cause the tension on the tape to increase due to the tape pull on the clamp. This tension in turn exerts a force on the first projection which is fabricated and located in such a manner that it exerts a corresponding force on the second projection. The second projection is made to deflect which results in a torque being applied to the reel, counter to the motion of the reel, serving to damp out spurious oscillating motion and thereby preventing disturbances in the operation of the tape transport.

For a more detailed understanding of the present invention reference will be had to the accompanying description and drawing in which.

FIG. *4a* is a diagrammatic side view of an apparatus embodiment according to this invention.

FIG. *4b* is a diagrammatic front view of FIG. *4a*.

FIG. *4c* is a fragmentary diagrammatic bottom view of FIG. *4a*.

Figure 1:
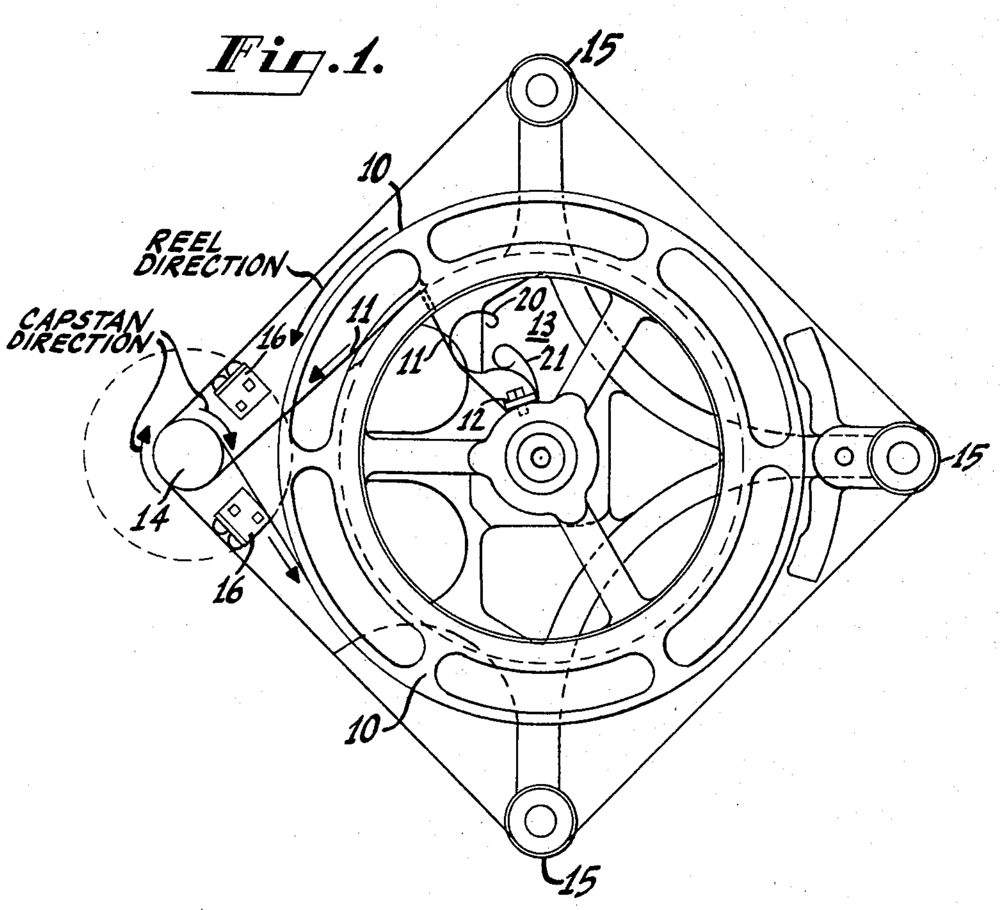
FIGURE 1 is a diagrammatic top view of a tape transport mechanism incorporating the present invention.
Figure 5:
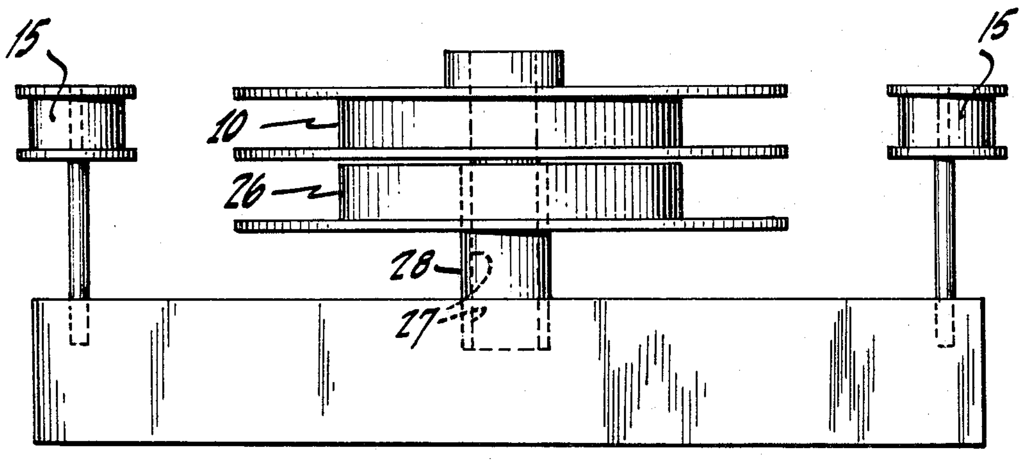

FIG. 5 is another view of the tape transport mechanism of FIG. 1.

If reference is made to FIGURE 1 there is shown a top reel 10, which may be a takeup or supply reel on a tape transport. Directly beneath reel 10 is another tape reel, not shown for clarity, but of the same size and configuration as reel 10. The tape transport shown in FIG. 1 has stacked take-up and supply reels to conserve space, but the invention is not limited to such configurations and any tape transport using one, two or more reels can operate with the present invention and achieve the improvements afforded thereby. There is shown a magnetic tape 11 which is fastened to reel 10, by means of a clamp 12, which also serves to fasten the flexible member 13, which is the main subject matter of the present invention, to the reel 10. The tape 11 is caused to move from reel 10 to a lower reel below, not shown, by means of the conventional rotary drive system which consists of a motor, not shown, a capstan 14, and idlers 15. The capstan 14 is driven by a motor as known in prior art and the reel 10 may also be driven by suitable means. Such drive mechanisms are known in the prior art and not considered part of this invention. There is also shown two heads 16, which may be playback and record magnetic heads or a playback and a record magnetic head and are included to portray the transport in a clearer manner. The arrow above the reel 10 indicates the direction of rotation of the reel 10. Hence, the tape is running towards the end or to the point where there will be no tape left on reel 10 and all the tape now will be on the lower reel. In normal operation the flexible member 13, has a first projection 20 which has a portion of its curved surface in contact with the tape 11, which in turn is deflected by member 13, when the tape 11 is being driven. The flexible member 13 has a second hook-like projection 21, which is positioned with respect to the first projection 20 as shown in FIGURE 1. The function of the two flexible projections will be more fully described later on. The flexible member 13, comprising the two projections 20 and 21 is fabricated from a flexible material, such as beryllium copper, steel, or some other suitable compound or alloy capable of spring like action.

Figure 2:
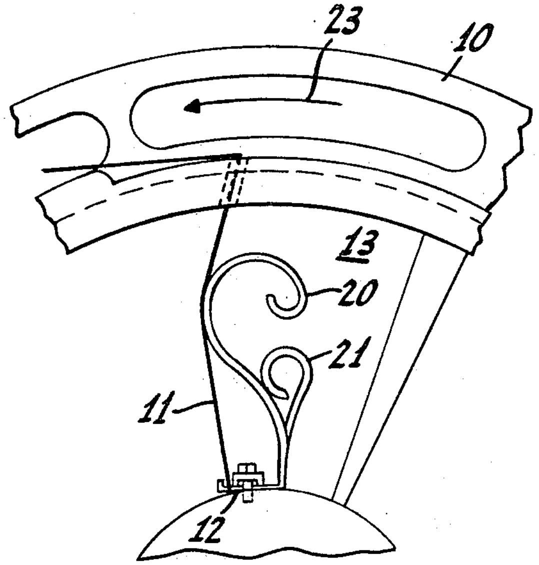
FIG. 2 is a fragmentary diagrammatic view taken from FIG. 1 showing the normal mode of the transport operation with the present invention.

FIGURE 2 is a fragmentary diagrammatic view of the complete flexible member 13, a portion of the reel 10 and a portion of the tape 11 as shown in FIGURE 1. The tape 11 as mentioned previously is secured to the reel 10 by means of a screw clamp 12, or some other suitable arrangement. The clamp 12 serves a dual purpose and holds the tape and the member 13 simultaneously. The first projection 20 of member 13 is positioned to deflect the tape 11 while the tape is being moved in a normal manner. Although projection 20 is shown to have a hooklike or semicircular shape it may be some other suitable shape as well; the requirement being that its surface be smooth where it comes into contact with the tape 11 so as not to scratch the tape. Also, the projection 20 must be flexible enough to enable movement upon the application of a suitable force. The second smaller projection 21 is located relative to projection 20 as the figure shows. The exact shape of projection 21 can also be varied, and the requirements for the projection 21 are that it be flexible and be of a shape to enable the transfer of energy or force from projection 20 to projection 21. This projection 21 also has to exert a torque on reel 10 when a force is exerted on it via projection 20.

Figure 3:
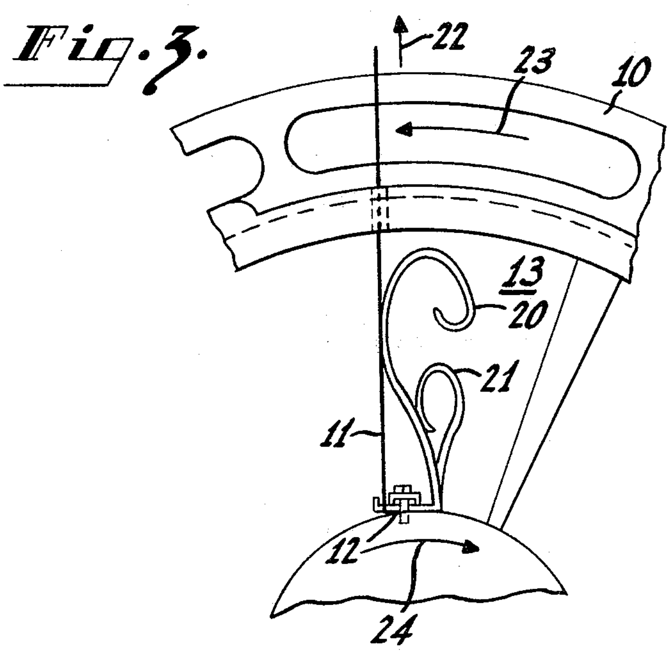
FIG. 3 is the same fragmentary view of FIG. 2, showing the final stop or end-of-tape condition.

If reference is made to FIG. 3, there is shown the same fragmentary view as for FIG. 2 with the exception that the final stop or actual end-of-tape position has been reached and the tape 11 is being pulled upward by the action of the drive system of the transport and the screw clamp assembly 12. The direction of the force exerted on the tape 11 is referenced by arrow 22. When the actual end-of-tape or final stop position is reached, the tension on the tape 11 is increased. The tape 11 then pulls straight and deflects the member 13, via its first projection 20. The projection 20 exerts a force on projection 21 which pushes on the tape reel 10's hub and results in a torque being applied counter to the reel 10's direction of motion. Hence, if the reel is moving in the direction indicated by arrow 23, then the torque is applied in the direction indicated by arrow 24. The tape 11 dragging across the face of the deflected member 13, particularly projection 20, causes a dampening of the motion as well. After the tape 11 is pulled tight the reel 10 tries to reverse its motion in the direction of the torque applied via member 13 and due to reel inertia. There may be a slight reversal, and member 13 will try to go back to its position as shown in FIGS. 1 and 2. But if it succeeds, the tension on the tape 11 will again cause member 13 to exert a torque on reel 10 due to the action of projections 20 and 21 and such motion is quickly damped out and stopped. The magnitude of the shock applied to the tape transport upon reaching the end of tape has, in practice, been reduced by 90% by the use of this invention.

Figure 4A:
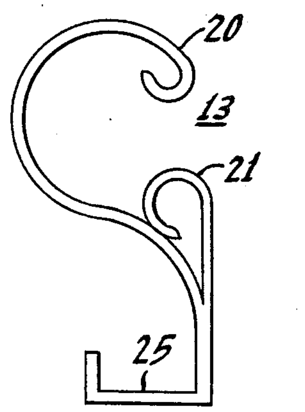
Figure 4B:
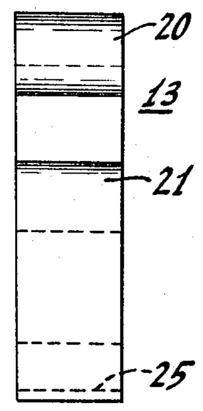
Figure 4C:
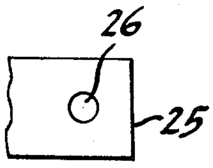

FIG. 4 is a front view of the flexible member 13, showing the bottom lip 25 for mounting to the reel. The side view is shown in FIG. 4*b* indicating that the member has width, which is slightly wider than the width of the magnetic tape used in the transport system. The bottom view shown in FIG. 4*c* shows the hole 26 used for accommodating a screw or bolt or other suitable means for fastening to the reel 10. The member shown in FIGS. 4*a*, *b* and *c* may be fabricated from one piece of material or the larger hooklike projection 20 may be fabricated together with a bottom lip as 25, from one material and the one small member 21, together with a matching bottom lip as 25 may be fabricated from another material and the two members 20 and 21 can be soldered, bolted or fastened together by suitable means to form a member as 13.

The member shown in FIGS. 4*a*, *b* and *c* can assume different configurations, and still operate in the manner described without deviating from the spirit and scope of this invention. While the flexible member has been shown mounted on only one reel of a tape transport, where the tape transport operates in both direction, a similar member can be provided at each reel. The members are reversed one hundred eighty degrees from one another to allow for the different tape direction.

FIGURE 5 is a simplified side view given by way of example of a known tape reel assembly useable in the embodiment of FIGURE 1. The top reel 10 and the bottom reel 26 are mounted on concentric shafts 27 and 28 for rotation in a suitable manner, not shown.

What is claimed is:

1. In a tape transport including takeup and supply reels and tape firmly secured at its ends to said reels so as to be driven between said reels:

a flexible member having provisions at one end for mounting to one of said reels, the other end of said member having two flexible projections positioned with respect to each other in such a manner that one of said projections can exert force on said other projection, means for mounting said member on one of said reels to deflect said tape while said tape is driven between said reels and to cause a force to be exerted on said one projection by said tape upon said tape reaching its end on said one reel, and said other projection being adapted to be acted upon by the force exerted on said one projection to exert a torque on said reel counter to the direction of movement of said reel.

2. In combination, (a) a tape transport including a takeup reel and a supply reel, (b) means for firmly securing a tape between said takeup reel and supply reel, said securing of said tape defining final stop positions for said tape, and (c) a flexible member adapted at one end to be mounted on one of said reels and having at its other end a first and second hook like flexible projection, said first projection acting to deflect said tape while said tape is driven between said reels and having a force exerted thereon by said tape upon said tape reaching said final stop position with respect to said one reel, said second projection acting in response to said force to exert a torque on said reel.

3. In a tape transport including takeup and supply reels and a tape firmly secured at its end to said reels so as to be driven between said reels:

a flexible member having provisions at one end for connection to one of said reels, and adapted at its other end to deflect said tape while said tape is driven between said reels, and means coupled to said flexible member and responsive to a force exerted on said member by said tape to exert a torque on said one reel in a direction counter to the direction of rotation of said reel.

4. End of tape cushioning apparatus for minimizing stretching of tape and oscillations of rotating parts including in combination:

(a) a takeup and supply reels, (b) a magnetic tape firmly secured at its ends to said reels defining a final stop position, and (c) a member fabricated from a flexible material, said member having provisions at one end for mounting to one of said reels, said member's other end having a larger and a smaller projection, said projections formed so that said large projection is further adapted at said other end to respond to said tape tension, deflecting said tape when said tape is driven, and itself being deflected when said tape reaches said final stop position said deflection of said larger projection exerting a force on said small projection which in turn exerts a torque in response to said force on said reel which said member is mounted on.

5. A tape reel comprising:

a screw clamp assembly for securing a tape at one end to said reel for movement of said tape onto and off of said reel, and a flexible member having provisions at one end for mounting to said reel via said screw clamp, the other end of said member having two flexible projections positioned with respect to each other in such a manner that a first one of said projections can exert a force on said other projection, said first projection further adapted to deflect said tape as said tape is driven off said reel and to have a force exerted on it by said tape upon said tape reaching its end on said reel, said other projection in response to said force on said first projection exerting a torque on said reel counter to the direction of movement of said reel.

6. A tape reel comprising:
means for clamping a tape at one end to said reel for movement of said tape onto and off of said reel, and
a flexible member secured at one end to said reel and having a first and a second projection at its other end, said member being mounted on said reel to cause said first projection to deflect said tape as said tape is driven off of said reel and to have a force exerted on it by said tape upon said tape reaching its end on said reel, said first and second projections being constructed relative to one another and said reel to cause said second projection to act in response to said force on said first projection to exert a torque on said reel counter to the direction of movement of said reel.

7. A tape reel according to claim 6 where said member is fabricated from beryllium copper.

8. A tape reel comprising:
(a) means for clamping a tape at one end to said reel for movement of said tape onto and off of said reel,
(b) a flexible member having provisions at one end for connection to said reel and adapted at its other end to deflect said tape while said tape is driven, said member being further adapted to be deflected by said tape when said tape is driven off said reel, and
(c) second means mounted on said reel and coupled to said flexible member to exert a torque counter to the direction of said reel on said reel in response to said force exerted on said flexible member by said tape.

References Cited

UNITED STATES PATENTS 2,290,853 7/1942 Frankel ---------- 242—74.2
3,265,317 8/1966 Liang et al. -------- 242—55.13
3,334,837 8/7967 Henriksen ---------- 242—74

LEONARD D. CHRISTIAN, *Primary Examiner.*